US011979953B2

(12) United States Patent
Sun et al.

(10) Patent No.: US 11,979,953 B2
(45) Date of Patent: May 7, 2024

(54) COLOR LED DRIVING CIRCUIT AND COLOR CONTROLLER

(71) Applicant: Bright Power Semiconductor, Inc., Shanghai (CN)

(72) Inventors: Shungen Sun, Shanghai (CN); He Huang, Shanghai (CN); Liqiang Hu, Shanghai (CN)

(73) Assignee: BRIGHT POWER SEMICONDUCTOR, INC., Shanghai (CN)

( * ) Notice: Subject to any disclaimer, the term of this patent is extended or adjusted under 35 U.S.C. 154(b) by 86 days.

(21) Appl. No.: 17/758,170

(22) PCT Filed: Dec. 29, 2020

(86) PCT No.: PCT/CN2020/140758
§ 371 (c)(1),
(2) Date: Jun. 29, 2022

(87) PCT Pub. No.: WO2021/136257
PCT Pub. Date: Jul. 8, 2021

(65) Prior Publication Data

US 2023/0041543 A1 Feb. 9, 2023

(30) Foreign Application Priority Data

Dec. 30, 2019 (CN) ......................... 201911400912.7

(51) Int. Cl.
*H05B 45/20* (2020.01)
*H05B 45/325* (2020.01)

(52) U.S. Cl.
CPC ........... *H05B 45/20* (2020.01); *H05B 45/325* (2020.01)

(58) Field of Classification Search
CPC ........ H05B 45/10; H05B 45/20; H05B 45/30; H05B 45/325; H05B 45/37; H05B 45/40; H05B 47/10
See application file for complete search history.

(56) References Cited

U.S. PATENT DOCUMENTS 10,667,362 B1 * 5/2020 Coetzee ................. H05B 45/39
2018/0317292 A1 * 11/2018 Katsura ................ H05B 45/397

FOREIGN PATENT DOCUMENTS

CN 103929851 A 7/2014
CN 107567144 A 1/2018
(Continued)

OTHER PUBLICATIONS

International Search Report from corresponding International Application No. PCT/CN2020/140758 dated Mar. 25, 2021.

*Primary Examiner* — Jimmy T Vu
(74) *Attorney, Agent, or Firm* — Perkins Coie LLP

(57) ABSTRACT

The present application provides a color LED driving circuit, which comprises a set of switches and a color controller. The switch assembly has a first switch and a second switch, respectively having a first terminal, a second terminal and a control terminal. The first terminal of the first switch is configured to be coupled to a first LED load, and the first terminal of the second switch is configured to be coupled to a second LED load. The color controller comprises a first controller and a second controller. A ground terminal of the first controller is coupled to ground. The first controller is used to generate an output signal according to a PWM signal, and transmit the output signal to the second controller. The second controller is used to generate a first driving signal and a second driving signal according to the output signal, and output the first driving signal and the second driving signal to the control terminals of the first switch and the second switch through a first driving terminal (Continued)

100 and a second driving terminal, respectively. A reference terminal of the second controller is coupled to the second terminal of the first switch and the second terminal of the second switch, and potential of the reference terminal is different from a potential of the ground terminal of the first controller.

29 Claims, 6 Drawing Sheets

(56) References Cited

FOREIGN PATENT DOCUMENTS

| | | | |
|---|---|---|---|
| CN | 206851095 | U | 1/2018 |
| CN | 111083844 | A | 4/2020 |
| EP | 3398411 | A1 | 11/2018 |

* cited by examiner

COLOR LED DRIVING CIRCUIT AND COLOR CONTROLLER

FIELD OF THE INVENTION

This application mainly relates to an LED driving circuit, and particularly relates to a color LED driving circuit with a color-adjusting function and a LED color adjusting controller thereof.

BACKGROUND

LED has attracted more and more attention for its advantages of high efficiency, energy saving, environmental protection and long life. LED lamps have gradually replaced traditional fluorescent lamps as a new type of green light source. With the continuous expansion of LED toning applications, LED lighting has gradually developed from the simple lighting function to intelligence, humanization and energy saving. In order to meet people's requirements for lighting in different scenarios, LED lighting with dimming and color-adjusting functions have emerged.

FIG. 1 is a schematic diagram of a conventional color LED driving circuit. As shown in FIG. 1, the conventional LED color-adjusting circuit 100 is implemented by using discrete components such as opto-coupler OCEP and MOS transistors. Such circuits have many elements to form a complex structure but perform a simple function. Moreover, because the opto-coupler OCEP itself needs to consume a large current, the efficiency is low.

China patent publication No. CN107567144A proposes an color LED driving circuit. The LED color-adjusting controller in the circuit is integrated into a high-voltage die. A high-voltage level-shift circuit is also integrated on the high-voltage die to simplify the peripheral circuit and improve the efficiency. The high-voltage die requires a fully isolated high-voltage island on the die to isolate the high voltage gap between a control ground GND and a drive ground VL. This isolation island places high demands on manufacturing process.

SUMMARY

The present application provides a color LED driving circuit and a color controller, which can reduce the demands on the manufacturing process.

A color LED driving circuit provided according to one aspect of the present application, comprising a set of switches and a color controller. The switch assembly has a first switch and a second switch. The first switch and the second switch have a first terminal, a second terminal, and a control terminal. The first terminal of the first switch is configured to be coupled to a first LED load. The first terminal of the second switch is configured to be coupled to a second LED load. The color controller comprises a first controller and a second controller. The first controller has a control signal terminal, a signal output terminal, and a ground terminal. The ground terminal of the first controller is coupled to ground. The first controller is configured to generate an output signal via the signal output terminal according to a PWM signal from the control signal terminal, and output the output signal through the signal output terminal. The second controller has a signal input terminal, a first driving terminal, a second driving terminal, and a reference terminal. The signal input terminal is coupled to the signal output terminal. The first driving terminal is coupled to the control terminal of the first switch. The second driving terminal is coupled to the control terminal of the second switch. The reference terminal is coupled to the second terminal of the first switch and the second terminal of the second switch. The second controller is configured to generate a first driving signal and a second driving signal according to the output signal, and output the first driving signal and the second driving signal through the first driving terminal and the second driving terminal respectively. Potential of the reference terminal is different from that of the ground terminal of the first controller.

In an embodiment of the present application, the first controller comprises a pulse generator. The pulse generator is coupled to the control signal terminal and the signal output terminal, which is configured to generate a pulse output signal via the signal output terminal according to the PWM signal from the control signal terminal.

In an embodiment of the present application, the second controller comprises a trigger and a pre-driver. The trigger is coupled to the signal input terminal, and is configured to generate a trigger signal according to the output signal. The pre-driver is coupled to the trigger, the first driving terminal and the second driving terminal, configured to generate a first driving signal and a second driving signal according to the trigger signal, and output the first driving signal and the second driving signal through the first driving terminal and the second driving terminal respectively.

In an embodiment of the present application, the second controller further comprises a power supply terminal, the power supply terminal is coupled to a DC bus line, wherein the first controller further comprises a control power supply terminal. The control power supply terminal receives a controller voltage. The controller voltage is lower than a peak voltage of the DC bus line.

In an embodiment of the present application, the second controller further comprises a power supply terminal. The power supply terminal is directly connected to the DC bus line.

In an embodiment of the present application, the LED toning driving circuit further comprises a rectifier bridge, which is coupled to an AC input power supply to provide a bus voltage on the DC bus line.

In an embodiment of the present application, the second controller further comprises a JFET device and a low-voltage linear power supply. The JFET device is coupled to the power supply terminal of the second controller. The low-voltage linear power supply is coupled to the JFET device to supply power for the second controller.

In an embodiment of the present application, the first controller and the second controller are separate dies packaged into a single chip assembly.

In an embodiment of the present application, the signal input terminal of the output signal is coupled to the signal output terminal via a bonding wire.

In an embodiment of the present application, the first controller and the second controller are packaged into chip assemblies.

In an embodiment of the present application, the switch assembly is a planar field effect transistor (FET) power device, which is integrated into a single die with the second controller or packaged into a chip assembly with the second controller.

Another aspect of the present application provides a color controller, used in a color LED driving circuit. The LED toning driving circuit has a first switch configured to drive a first LED load and a second switch configured to drive the second LED load. The color controller comprises a first controller and a second controller. The first controller has a control signal terminal, a signal output terminal and a ground terminal. The first controller is configured to generate an output signal via the signal output terminal according to a PWM signal from the control signal terminal, and output the output signal through the signal output terminal. The second controller has a signal input terminal, a first driving terminal, a second driving terminal, and a reference terminal. The signal input terminal is coupled to the signal output terminal. The first driving terminal is coupled to a control terminal of the first switch. The second driving terminal is coupled to a control terminal of the second switch. The second controller is configured to generate a first driving signal and a second driving signal according to the output signal, and output the first driving signal and the second driving signal through the first driving terminal and the second driving terminal respectively. Potential of the reference terminal is different from that of the ground terminal of the first controller.

Compared with the prior art, the ground terminal of the first controller and the reference terminal (which is a ground terminal) of the second controller in the present application are separated. Besides, the first controller can transfer a control signal to the second controller. In this way, a natural isolation of high voltage between the first controller and the second controller is implemented without a need for an additional isolation island, thereby reducing the demands on the manufacturing process and reducing the cost.

BRIEF DESCRIPTION OF THE DRAWINGS

The drawings are involved to provide a further understanding of the application. They are involved, and constitute a part of the application. The drawings show embodiments of the application, and explain the principle of the description together with the description.

DETAILED DESCRIPTION

Figure 1:
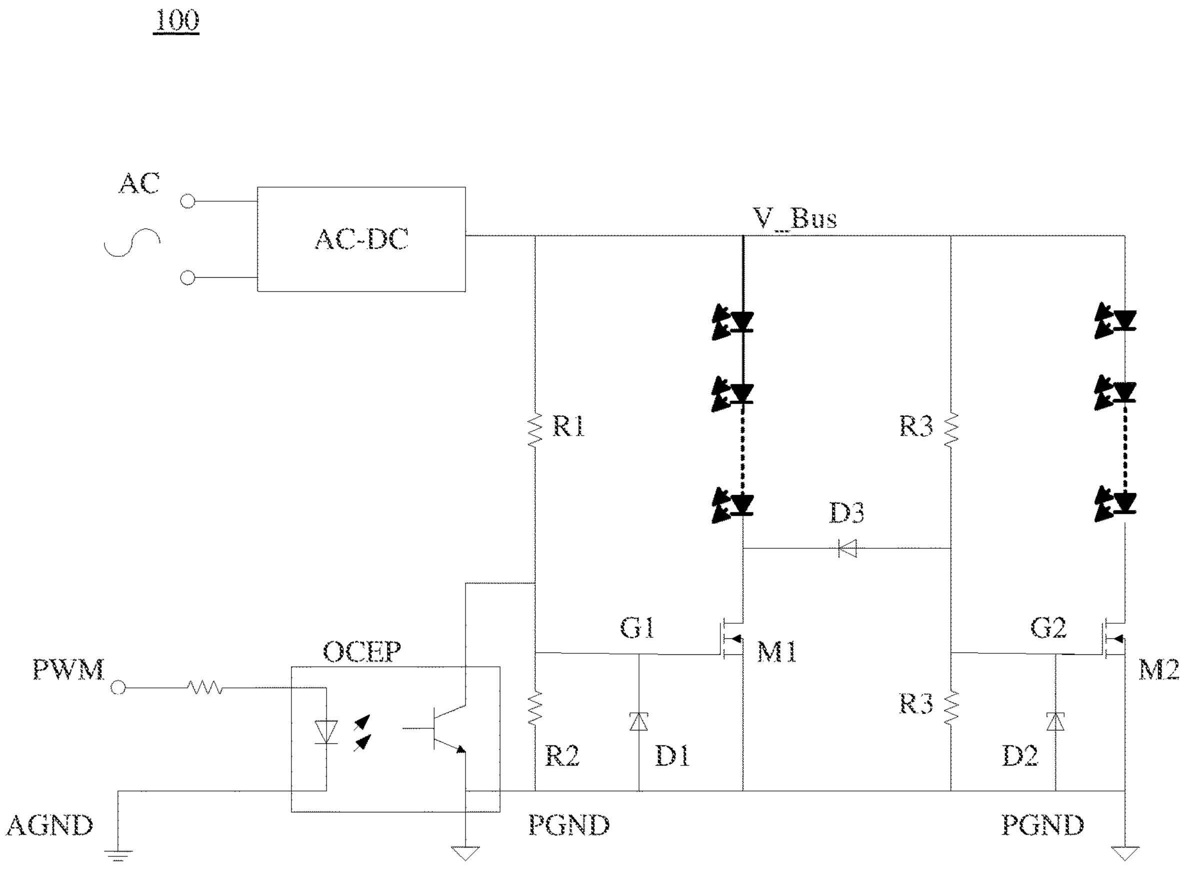
FIG. 1 is a schematic diagram of the traditional LED toning driving circuit.

In order to more clearly illustrate the technical proposals of the embodiments of the present application, the following will briefly introduce the drawings that need to be used in the description of the embodiments. Obviously, the drawings in the following description are just some examples or embodiments of the application. For those of ordinary skill in the art, without creative work, the application can also be applied to other similar scenarios according to these drawings. Unless it is obvious from the language environment or otherwise stated, the same reference numerals in the figures represent the same structure or operation.

As shown in the present application and claims, unless the context clearly indicates exceptions, the words "a", "an", "a kind of" and/or "the" do not specifically refer to the singular, but may also include the plural. Generally speaking, the terms "include" and "comprise" only suggest that the clearly identified steps and elements are included, and these steps and elements do not constitute an exclusive list, and the method or device may also include other steps or elements.

Unless specifically stated otherwise, the relative arrangement, numerical expressions and numerical values of the components and steps, set forth in these embodiments, do not limit the scope of the present application. At the same time, it should be understood that, for ease of description, the sizes of the various parts shown in the drawings are not drawn according to actual proportional relationships. The technologies, methods, and equipment known to those of ordinary skill in the relevant fields may not be discussed in detail, however, the technologies, methods, and equipment should be regarded as part of the authorization specification under appropriate circumstances. In all the examples shown and discussed herein, any specific value should be interpreted as merely exemplary and not as limiting. Therefore, other examples of the exemplary embodiment may have different values. It should be noted that similar reference numerals and letters indicate similar items in the following drawings, so once an item is defined in one drawing, it does not need to be further discussed in the subsequent drawings.

In addition, it should be explained that the use of terms such as "first" and "second" to define parts is only for the convenience of distinguishing the corresponding parts. Unless otherwise stated, the above terms have no special meaning and therefore cannot be understood to limit the scope of protection of this application. In addition, although the terms used in this application are selected from well-known and public terms, some of the terms mentioned in the specification of this application may be selected by the applicant according to his or her judgment. The detailed meanings thereof are described herein in the relevant part of the description. In addition, it is required to understand this application not only through the actual terms used, but also through the meaning contained in each term.

It should be understood that when a component is referred to as being "on another component", "connected to another component", "coupled to another component" or "contacting another component", it can be directly connected to another component, jointed to or coupled to, or in contact with the other component, or there may be an intervening component. In contrast, when a component is referred to as being "directly on," "directly jointed to," "directly coupled to," or "directly in contact with" another component, there is no intervening component. Likewise, when the first component is referred to as "electrical contact" or "electrically coupled to" the second component, there is an electrical path between the first component and the second component that allows current to flow. The electrical path may include capacitors, coupled inductors, and/or other components that allow current to flow, even without direct contact between conductive components.

Figure 2:
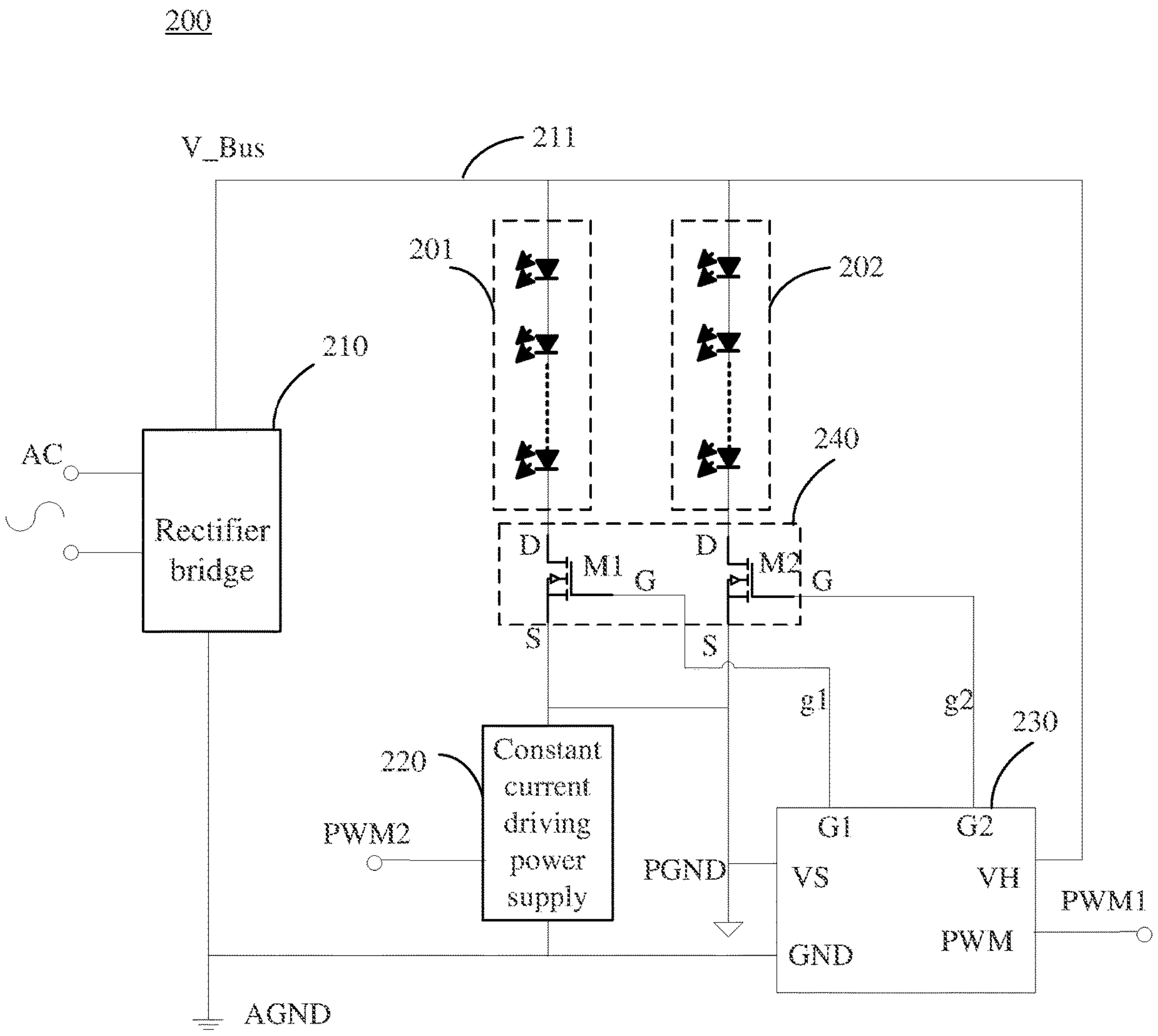
FIG. 2 is a schematic diagram of a color LED driving circuit according to an embodiment of the present application.

FIG. 2 is a schematic diagram of a color LED driving circuit according to an embodiment of the present application. As shown in FIG. 2, the LED toning driving circuit 200 is configured to drive a first LED load 201 and a second LED load 202. Each LED load may comprise one or more LED devices connected in series and/or in parallel. The first LED load 201 and the second LED load 202 may be LEDs of different colors. The LED toning driving circuit 200 may comprise a rectifier bridge 210, a constant current driving power supply 220, a color controller 230, and a set of switches 240. The rectifier bridge 210 is electrically coupled to an AC input power supply and provides a voltage V_Bus to a DC bus line 211. Two LED loads 201 and 202 are connected to the rectifier bridge 210 in parallel. The switch assembly 240 may have a first switch M1 and a second switch M2. Herein, examples of the switches M1 and M2 are MOS power transistors, but those skilled in the art may understand that other types of devices can be used. The first switch M1 and the second switch M2 have a first terminal D, a second terminal S, and a control terminal G, respectively. The first terminal D of the first switch M1 is configured to be coupled to the first LED load 201, and the first terminal D of the second switch M2 is configured to be coupled to the second LED load 202. The constant current driving power supply 220 is electrically coupled to the second terminals S of the switches M1 and M2 of the switch assembly 240. The constant current driving power supply 220 is connected to a second pulse width modulation signal PWM2, and controls the current flowing through the LED loads 201 and 202 according to the second pulse width modulation signal PWM2. The color controller 230 is electrically coupled to the rectifier bridge 210 to obtain power supply, and is electrically coupled to the switch assembly 240 to control its on or off. Specifically, the color controller 230 generates a first control signal g1 and a second control signal g2 according to a received first pulse width modulation signal PWM1, and outputs them to the switches M1 and M2 of the switch assembly 240, respectively. In some embodiments, the first control signal g1 and the second control signal g2 may be complementary control signals. The switch assembly 240 is configured to adjust the current flowing through the first LED load 201 and the second LED load 202 according to the on or off of the received control signals g1 and g2.

In the embodiment of the present application, the constant current driving power supply 220 may be a switching power supply or a linear constant current supply, but is not limited thereto. The constant current driving power supply 220 is configured to control the total current flowing through the first LED load 201 and the second LED load 202, thereby adjusting the brightness of the first LED load 201 and the brightness of the second LED load 202.

The color controller 230 may be configured to distribute the proportion of current flowing through the first LED load 201 and the second LED load 202. The first LED load 201 and the second LED load 202 may be LED loads of two different colors. Therefore, in a certain period of time, when the proportion of the current flowing through the first LED load 201 is greater than the proportion of the current flowing through the second LED load 202, the color displayed by the entire LED load is dominated by the displayed color of the first LED load 201. For example, the color displayed by the first LED load 201 (for example, composed of a plurality of white LED light strings) is white, and the color displayed by the second LED load 202 (for example, composed of a plurality of yellow LED light strings) is yellow. In a certain period of time, when the proportion of the current flowing through the first LED load 201 is greater than the proportion of the current flowing through the second LED load 202, the color displayed by the entire LED load is mainly white. On the contrary, the color displayed by the entire LED load is mainly yellow.

Of course, in some other embodiments, within a certain period of time, if the proportion of current flowing through the first LED load 201 is equal to the proportion of current flowing through the second LED load 201, the color displayed by the entire LED load is a mixed color of the displayed color of the first LED load 201 and the second LED load 202.

The work of the constant current driving power supply 220 and the color controller 230 in this embodiment can be referred in CN107567144A, which will not be detailed described herein.

Figure 3:
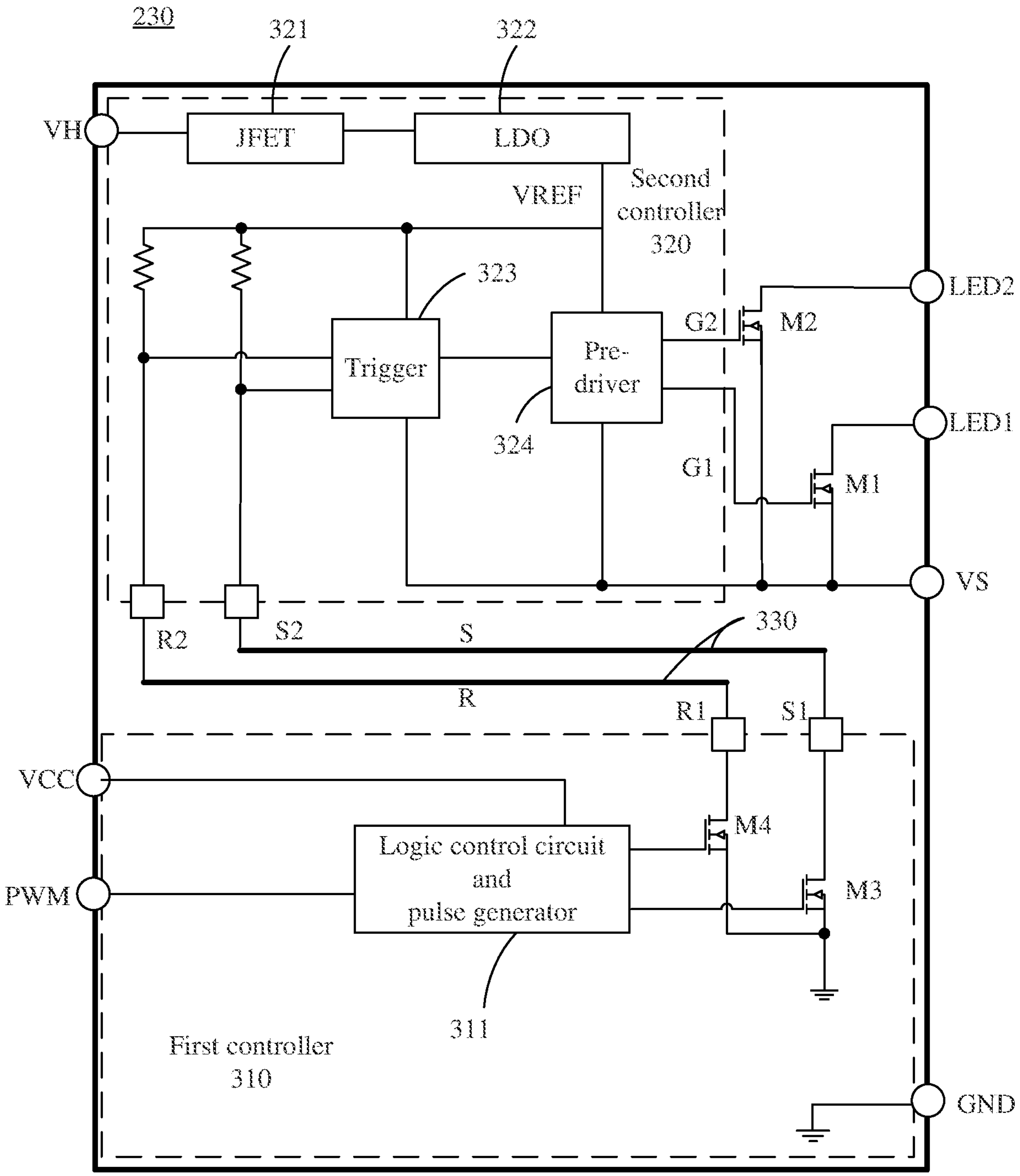
FIG. 3 is a schematic diagram of a color controller according to an embodiment of the present application.

FIG. 3 is a schematic diagram of a color controller according to an embodiment of the present application. Referring to FIG. 3, the color controller 230 may comprise a first controller 310 and a second controller 320 with relatively independent ground terminals. The first controller 310 may have a control power supply terminal VCC, a control signal terminal PWM, signal output terminals S1, R1, and a ground terminal GND. The control power supply terminal VCC can receive a controller voltage Vcc. The controller voltage Vcc is set based on the potential of the ground terminal GND. The controller voltage Vcc is generally supplied by a lower voltage provided by an additional power supply, such as 5V or 3.3V. The controller voltage Vcc is lower than the peak voltage on the DC bus line 211. The ground terminal GND can be coupled to the ground terminal AGND of the LED toning driving circuit 200. The control signal terminal PWM can obtain the first pulse width modulation signal PWM1 from an external PWM generator, generate pulse output signals S and R accordingly, and then output them through the signal output terminals S1 and R1. The second controller 320 may have a power supply terminal VH, signal input terminals S2, R2, a first driving terminal G1, a second driving terminal G2, and a reference terminal VS. The power supply terminal VH can be coupled to a positive terminal of the rectifier bridge 210 to obtain power supply. The signal input terminals S2, R2 are coupled to the signal output terminals S1, R1 of the first controller 310. The first driving terminal G1 is coupled to the control terminal G of the first switch M1. The second driving terminal G2 is coupled to the control terminal G of the second switch M2. The reference terminal VS is coupled to the second terminal S of the first switch M1 and the second terminal S of the second switch. The second controller 320 is configured to generate the first driving signal g1 and the second driving signal g2 according to the aforementioned pulse output signal, and output them through the first driving terminal G1 and the second driving terminal G2 respectively.

Different from the existing method, in this embodiment, the ground terminal GND of the first controller 310 and the reference terminal VS of the second controller 320 (which serves as a ground terminal of the second controller 320) are separated. The ground terminal GND serves as a control ground of the color controller 230, and is connected to the control ground terminal AGND of the LED toning driving circuit 200. The reference terminal VS serves as a driving ground of the color controller 230, and is connected to the driving ground terminal PGND of the LED toning driving circuit 200. Therefore, the potential of the reference terminal VS is different from the potential of the ground terminal GND of the first controller 310. In addition, the first controller 310 may be coupled to the signal input terminals S2, R2 by the signal output terminals S1, R1, transferring the pulse output signal to the second controller 320 as a control signal. In this way, a natural isolation of high voltage between the first controller 310 and the second controller 320 is implemented without a need for additional isolation islands, thereby reducing the demands on the manufacturing process and reducing the cost.

Figure 5:
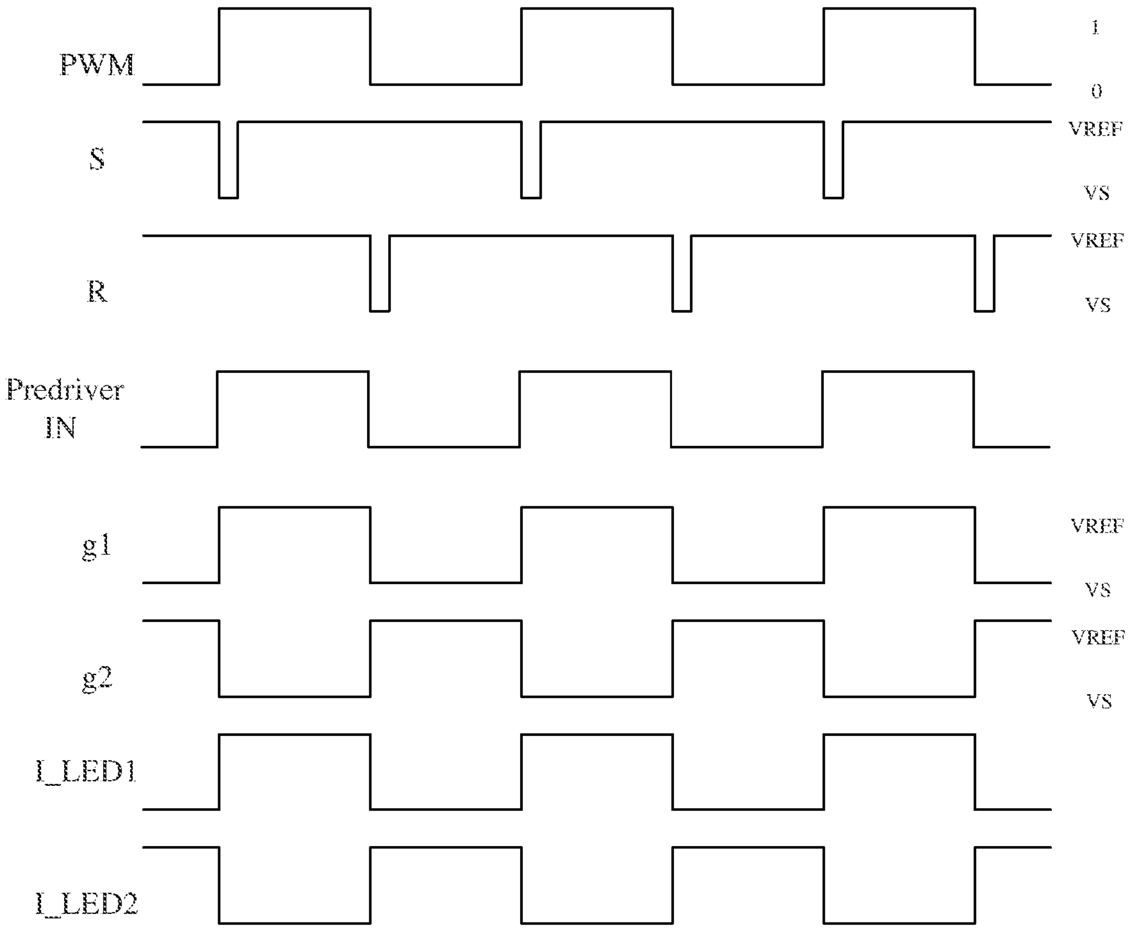
FIG. 5 is a working waveform diagram of the circuit shown in FIG. 2.

FIG. 5 is a working waveform diagram of the circuit shown in FIG. 2. Referring to FIGS. 2, 3 and 5, the first controller 310 may comprise a logic control circuit, a pulse generator 311 and HVNMOS transistors M3 and M4. The second controller 320 may comprise a trigger 323 and a pre-driver 324. After the PWM signal passes through the logic control circuit and the pulse generator 311 of the first controller 310, pulse output signals R and S are generated at the drains of the HVNMOS transistors M3 and M4. These two pulse output signals, used as an RS trigger 323 of the second controller 320, generate the trigger signal Predriver IN as an input signal of the pre-driver 324. The function of the pre-driver 324 is to convert a single-channel digital switching signal output by the trigger 323 into two complementary switching signals g1 and g2, meanwhile, enhance the driving capability to drive the power transistors M1 and M2. Finally, switching currents I_LED1 and I_LED2 are generated at the two LED loads 201 and 202.

In some embodiments of the present application, the first controller 310 and the second controller 320 may be separate dies packaged into a single chip assembly. In this case, the signal input terminals S2 and R2 are coupled to the signal output terminals S1 and R1 through a wire 330 via a bonding wire.

In some other embodiments of the present application, the first controller 310 and the second controller 320 may be packaged into separate chip assemblies, which are mounted on a circuit board and coupled by traces on the circuit board.

In the embodiment of the present application, the first switch M1 and the second switch M2 may be planar MOS field effect transistors, such as LDMOS (Lateral Double Diffuse MOS) field effect transistors. The main advantage of this type of device is the compatibility with planar process, so that the die where the second controller 320 is located can completely adopt the general planar process without considering the compatibility and integration of vertical devices.

In this embodiment, since the manufacturing process of the color controller 230 is more versatile, more devices can be integrated, such as power transistors M1, M2 and integrated JFET devices. Referring to FIG. 3, the power transistors M1, M2 may be integrated in the die where the second controller 320 is located. In an embodiment not shown in the figure, the power transistors M1, M2 may also be integrated in the package where the second controller 320 is located.

With continued reference to FIG. 3, the second controller 320 may also comprise a JFET device 321 and a low-voltage linear power supply (LDO) 322. The JFET device 321 is coupled to the power supply terminal VH of the second controller 320, configured to convert VH, such as a high voltage of 200V (e. g. the LED lamp bead voltage), into a pinch-off voltage VJ of the JFET device 321, such as 20V. The LDO 322 is coupled to the JFET device 321 for further converting VJ into an internal reference voltage VREF, such as 5V, as a power supply for the color controller 230.

Further, due to the function of the JFET device 321, the power supply terminal VH of the second controller 320 can be directly connected to the DC bus line 211 to input the DC power supply V_Bus, provided by the rectifier bridge 210, without connecting through an additional capacitor or resistor.

Hereinafter, more details of each unit/assembly of this application will be described with reference to the drawings. However, it is understood that those skilled in the art can make various modifications/replacements without departing from the spirit of this application after reading the following content. Therefore, the protection scope of this application is not limited to the embodiments described below.

Figure 4:
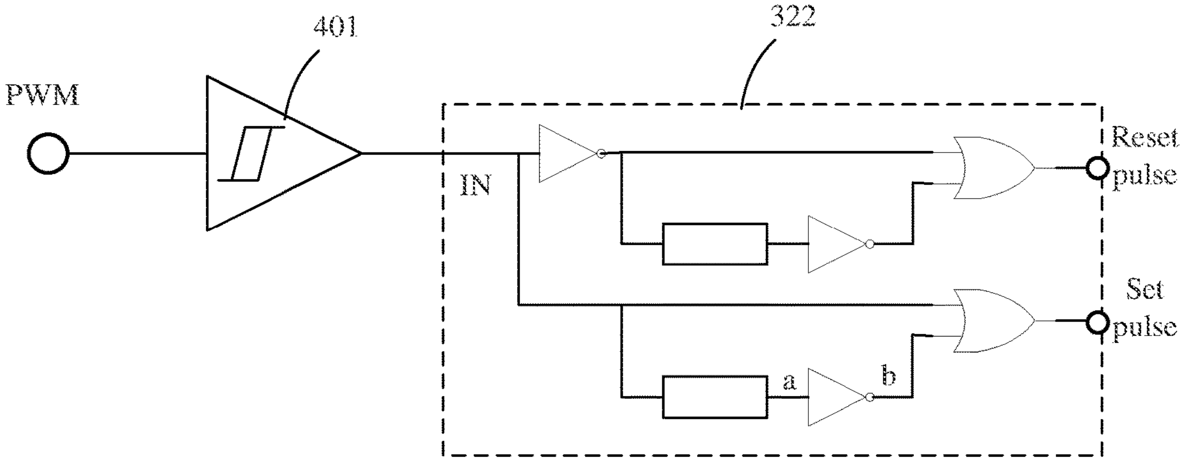
FIG. 4 is a schematic diagram of a logic control circuit and a pulse generator according to an embodiment of the present application.
Figure 6:
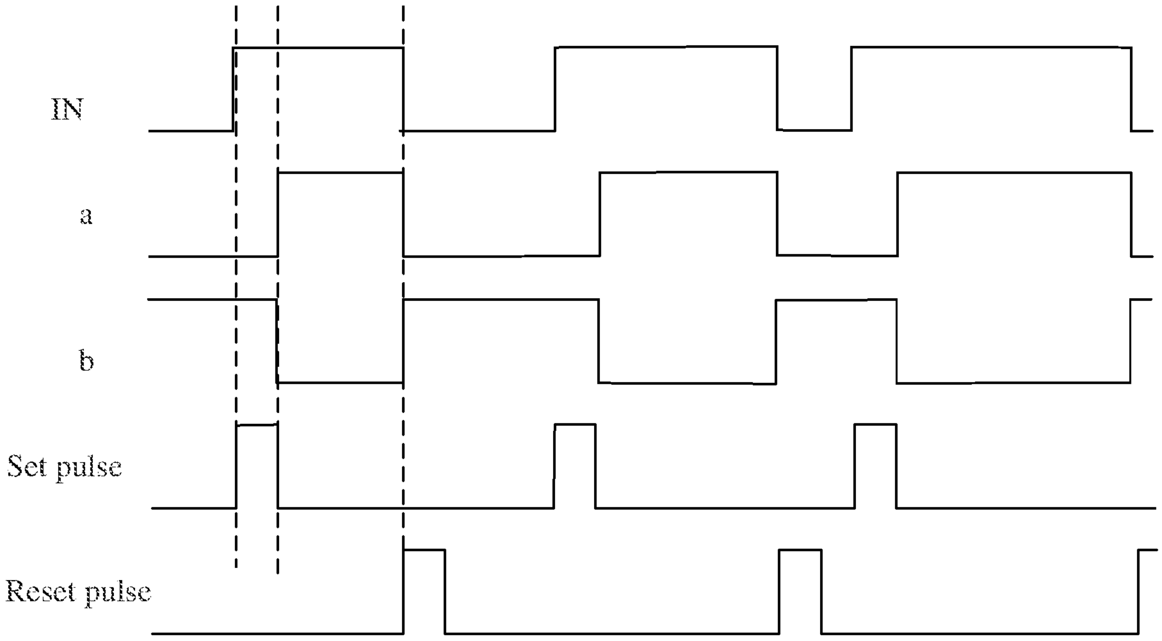
FIG. 6 is a working waveform diagram of the circuit shown in FIG. 4.

FIG. 4 is a schematic diagram of a logic control circuit and a pulse generator according to an embodiment of the present application. Referring to FIG. 4, the logic control circuit may comprise a Schmitt trigger 401. The pulse generator 410 may comprise a first inverter 411, a first rising edge delay circuit 412, a second rising edge delay circuit 413, a second inverter 414, a third inverter 415, a first OR gate 416, and a second OR gate 417. The pulse generator 410 can use the signal, triggered by the Schmitt trigger 401, to generate a set pulse S and a reset pulse R respectively. FIG. 6 is a working waveform diagram of the circuit shown in FIG. 4.

The basic concepts have been described above. Obviously, for those skilled in the art, the disclosure of the above application is merely an example, and does not constitute a limitation to the application. Although it is not explicitly stated here, those skilled in the art may make various modifications, improvements and amendments to this application. Such modifications, improvements and amendments are suggested in this application, therefore, such modifications, improvements and amendments still belong to the spirit and scope of the exemplary embodiments of this application.

At the same time, this application uses specific words to describe the embodiments of the application. For example, “one embodiment”, “an embodiment”, and/or “some embodiments” mean a certain feature, structure, or characteristic related to at least one embodiment of the present application. Therefore, it should be emphasized and noted that “one embodiment” or “an embodiment” or “an alternative embodiment” mentioned twice or more in different positions in this description does not necessarily refer to a same embodiment. In addition, certain features, structures, or characteristics in one or more embodiments of the present application can be appropriately combined.

For the same reason, it should be noted that in order to simplify the expression disclosed in this application and thus help to understand of one or more application embodiments, in the foregoing description of the embodiments of this application, a plurality of features are sometimes combined into one embodiment, one drawing or the description thereof. However, this disclosure method does not mean that the subject of the application requires more features than those mentioned in the claims. In fact, the features of the embodiment are less than all the features of the single embodiment disclosed above.

In some embodiments, numbers describing the number of ingredients and attributes are used. It should be understood that such numbers, used in the description of the embodiments, are modified by modifiers “about”, “approximately” or “substantially” in some examples. Unless otherwise stated, “about”, “approximately” or “substantially” indicates that the number is allowed to vary by ±20%. Correspondingly, in some embodiments, the numerical parameters used in the description and claims are all approximate values, and the approximate values can be changed according to the required characteristics of individual embodiments. In some embodiments, the numerical parameter should consider the prescribed effective digits and adopt the method of general digit retention. Although the numerical ranges and parameters, used to confirm the breadth of the ranges in some embodiments of the present application, are approximate values, in specific embodiments, the setting of such numerical values is as accurate as possible within a feasible range.

Although this application has been described with reference to the current specific embodiments, those of ordinary skill in the art should recognize that the above embodiments are only used to illustrate the application, and can be made various equivalent changes or substitutions without departing from the spirit of the application. Therefore, changes and modifications of the foregoing embodiments, within the essential spirit of the present application, will fall in the scope of the claims of the present application.

What is claimed is:

1. A color LED driving circuit, comprising:

a set of switches, comprising a first switch and a second switch, the first switch and the second switch respectively having a first terminal, a second terminal and a control terminal, the first terminal of the first switch adapted to coupled to a first LED load, the first terminal of the second switch adapted to coupled to a second LED load; and a color controller, comprising:

a first controller, comprising a control signal terminal, a signal output terminal and a ground terminal, wherein the ground terminal of the first controller is coupled to ground, the first controller generating an output signal via the signal output terminal according to a PWM signal from the control signal terminal; and a second controller, comprising a signal input terminal, a first driving terminal, a second driving terminal and a reference terminal, the signal input terminal being coupled to the signal output terminal of the first controller, the first driving terminal being coupled to a control terminal of the first switch, the second driving terminal being coupled to a control terminal of the second switch, the reference terminal being coupled to the second terminal of the first switch and the second terminal of the second switch, the second controller being configured to generate a first driving signal and a second driving signal according to the output signal, and output the first driving signal and the second driving signal through the first driving terminal and the second driving terminal respectively, and wherein a potential of the reference terminal is different from a potential of the ground terminal of the first controller.

2. The color LED driving circuit of claim 1, wherein the first controller comprises a pulse generator coupled to the control signal terminal and the signal output terminal, configured to generate a pulse output signal via the signal output terminal according to the PWM signal from the control signal terminal.

3. The color LED driving circuit of claim 1, wherein the second controller comprises:

a trigger, wherein the trigger is coupled to the signal input terminal and used to generate a trigger signal according to the output signal; and a pre-driver, coupled to the trigger, the first driving terminal and the second driving terminal, configured to generate a first driving signal and a second driving signal according to the trigger signal, and output the first driving signal and the second driving signal through the first driving terminal and the second driving terminal respectively.

4. The color LED driving circuit of claim 1, wherein the second controller further comprises a power supply terminal, the power supply terminal being coupled to a DC bus line , wherein the first controller further comprises a control power supply terminal, the control power supply terminal configured to receive a controller voltage, and wherein the controller voltage is lower than a peak voltage of the DC bus line.

5. The color LED driving circuit of claim 4, wherein the second controller further comprises a power supply terminal, the power supply terminal being directly connected to the DC bus line.

6. The color LED driving circuit of claim 4, further comprising:

a rectifier bridge, coupled to an AC input power supply to provide a bus voltage on the DC bus line.

7. The color LED driving circuit of claim 4, wherein the second controller further comprises:

a JFET device, coupled to the power supply terminal of the second controller;

a low-voltage linear power supply, coupled to the JFET device, configured to supply power for the second controller.

8. The color LED driving circuit of claim 5, wherein the second controller further comprises:

a JFET device, coupled to the power supply terminal of the second controller;

a low-voltage linear power supply, coupled to the JFET device, configured to supply power for the second controller.

9. The color LED driving circuit of claim 1, wherein the first controller and the second controller are separate dies packaged into a single chip assembly.

10. The color LED driving circuit of claim 9, wherein the signal input terminal is coupled to the signal output terminal via a bonding wire.

11. The color LED driving circuit of claim 1, wherein the first controller and the second controller are packaged into separate chip assemblies.

12. The color LED driving circuit of claim 9, wherein the set of switches comprises planar FET power devices, the set of switches being integrated into a single die with the second controller.

13. The color LED driving circuit of claim 9, wherein the set of switches comprises planar FET power devices, the set of switches being packaged into a chip assembly with the second controller.

14. The color LED driving circuit of claim 11, wherein the set of switches comprises planar FET power devices, the set of switches being integrated into a single die with the second controller.

15. The color LED driving circuit of claim 11, wherein the set of switches comprises planar FET power devices, the set of switches being packaged into a chip assembly with the second controller.

16. An LED color-adjusting controller for a color LED driving circuit, wherein the color LED driving circuit has a first switch configured to drive a first LED load and a second switch configured to drive a second LED load, the color controller comprising:

a first controller, comprising a control signal terminal, a signal output terminal and a ground terminal, wherein the first controller being configured to generate an output signal via the signal output terminal according to a PWM signal from the control signal terminal; and a second controller, comprising a signal input terminal, a first driving terminal, a second driving terminal and a reference terminal, the signal input terminal being coupled to the signal output terminal, the first driving terminal being coupled to a control terminal of the first switch, the second driving terminal being coupled to a control terminal of the second switch, the second controller being configured to generate a first driving signal and a second driving signal according to the output signal, and output the first driving signal and the second driving signal through the first driving terminal and the second driving terminal respectively, and wherein a potential of the reference terminal is different from a potential of the ground terminal of the first controller.

17. The LED color-adjusting controller of claim 16, wherein the first controller comprises a pulse generator, the pulse generator being coupled to the control signal terminal and the signal output terminal, configured to generate a pulse output signal via the signal output terminal according to the PWM signal of the control signal terminal.

18. The LED color-adjusting controller of claim 16, wherein the second controller comprises:

a trigger, wherein the trigger is coupled to the signal input terminal and configured to generate a trigger signal according to the output signal; and a pre-driver, coupled to the trigger, the first driving terminal and the second driving terminal, configured to generate a first driving signal and a second driving signal according to the trigger signal, and output the first driving signal and the second driving signal through the first driving terminal and the second driving terminal respectively.

19. The LED color-adjusting controller of claim 16, wherein the second controller further comprises a power supply terminal, the power supply terminal being coupled to a DC bus line, wherein the first control further comprises a control power supply terminal, the control power supply terminal configured to receive a controller voltage, wherein the controller voltage is lower than a peak voltage of the DC bus line.

20. The LED color-adjusting controller of claim 19, wherein the second controller further comprises a power supply terminal, and wherein the power supply terminal is directly connected to the DC bus line.

21. The LED color-adjusting controller of claim 18, wherein the first controller further comprises:

a JFET device, coupled to the power supply terminal of the second controller;

a low-voltage linear power supply, coupled to the JFET device, configured to supply power for the second controller.

22. The LED color-adjusting controller of claim 19, wherein the first controller further comprises:

a JFET device, coupled to the power supply terminal of the second controller;

a low-voltage linear power supply, coupled to the JFET device, configured to supply power for the second controller.

23. The LED color-adjusting controller of claim 16, wherein the first controller and the second controller are separate dies packaged into a single chip assembly.

24. The LED color-adjusting controller of claim 23, wherein the signal input terminal is coupled to the signal output terminal by bonding wire.

25. The LED color-adjusting controller of claim 16, wherein the ground terminal of the first controller is coupled to a ground terminal of the color LED driving circuit.

26. The LED color-adjusting controller of claim 16, wherein the reference terminal is coupled to a second terminal of the first switch and a second terminal of the second switch.

27. The LED color-adjusting controller of claim 16, wherein the first controller and the second controller are packaged into separate chip assemblies.

28. The LED color-adjusting controller of claim 23, wherein the first switch and the second switch are planar FET power devices, integrated into a single die with the second controller or packaged into a chip assembly with the second controller.

29. The LED color-adjusting controller of claim 27, wherein the first switch and the second switch are planar FET power devices, integrated into a single die with the second controller or packaged into a chip assembly with the second controller.

* * * * *